July 18, 1944. C. J. LANE ET AL 2,353,835
ELECTROMAGNETIC ACTUATING MECHANISM FOR SOLENOID VALVES OR THE LIKE
Filed April 25, 1942
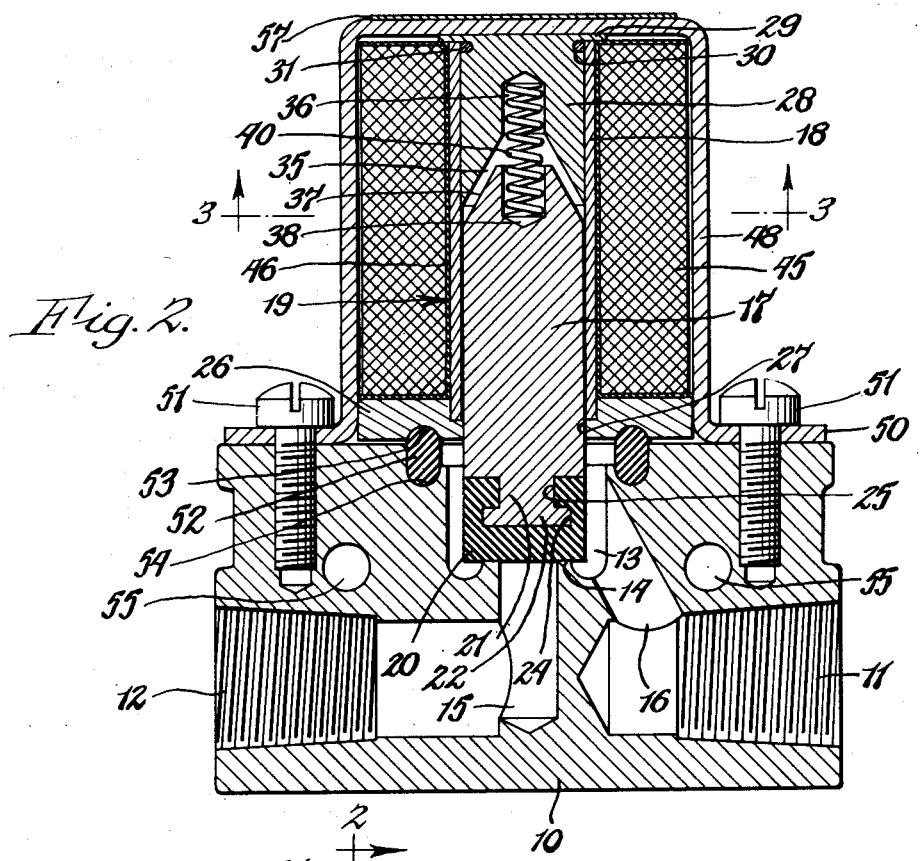
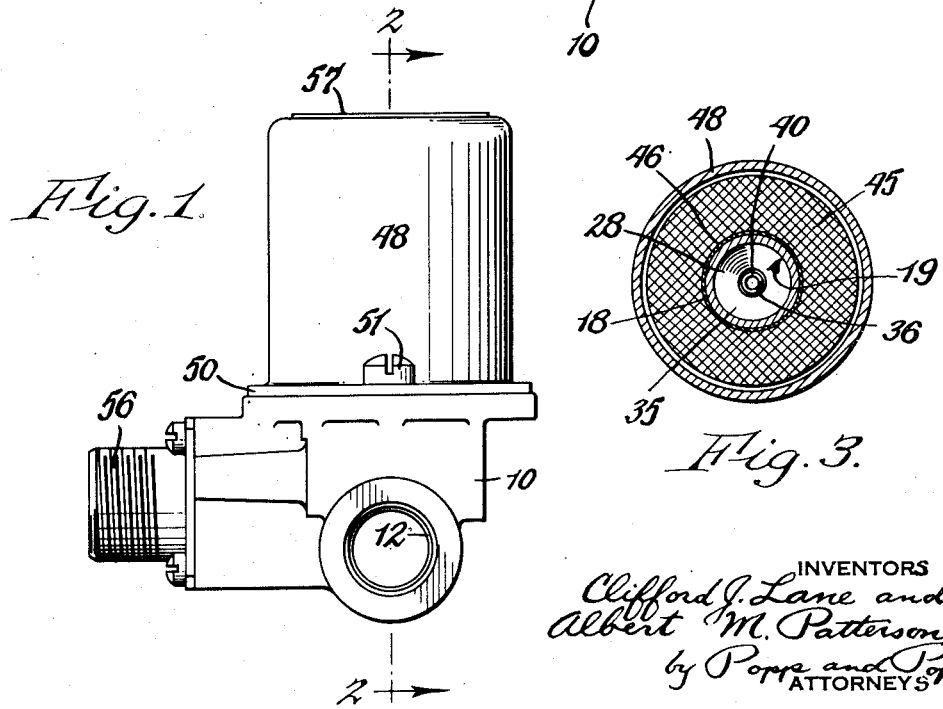
INVENTORS
Clifford J. Lane and
Albert M. Patterson
by Popp and Popp
ATTORNEYS Patented July 18, 1944

2,353,835

UNITED STATES PATENT OFFICE 2,353,835

ELECTROMAGNETIC ACTUATING MECHANISM FOR SOLENOID VALVES OR THE LIKE

Clifford J. Lane, Buffalo, and Albert M. Patterson, Lewiston, N. Y., assignors to Aeronautical Manufacturing Corporation, Niagara Falls, N. Y., a corporation of New York Application April 25, 1942, Serial No. 440,446

1 Claim. (Cl. 175—341)

This invention relates to an electromagnetic actuating mechanism for a solenoid valve or the like and more particularly to such an actuating mechanism for a solenoid valve adapted for use in airplanes as, for example, a gasolene valve to control the flow of gasoline into the oil systems of combustion engines when oil dilution is required to permit of easy starting and also as a heater control valve to control the flow of fuel to the heater used for heating the cock pit of the airplane. The invention is, however, not limited to any particular use and will handle all types of fluids which will not affect the synthetic rubber or other soft, resilient, plastic material used as the sealing means for the valve.

One of the principal objects of the invention is to provide an electromagnetic actuating mechanism for a solenoid valve which can be designed to handle all types of fluids and which will operate under high pressures and may be supplied with any type of coil to suit various voltages and current conditions.

Another object of the invention is to provide such an electromagnetic actuating mechanism which is extremely simple and inexpensive in construction, thereby permitting of the valve being supplied in quantity and at low cost.

Another object of the invention is to provide such an actuating mechanism for a valve in which the solenoid coil is completely sealed from the fluid which the valve handles.

Another object is to provide such an actuating mechanism for a valve in which the core of the solenoid, which also forms the plunger of the valve, is held to its seat both by spring pressure and also the pressure of the fluid handled by the valve so as to resist the effect of inertia on the plunger as well as to assist the seating of the plunger.

In the accompanying drawing:

Fig. 1 is a side elevation of a solenoid valve embodying our invention.

Fig. 2 is an enlarged vertical sectional view, taken on line 2—2, Fig. 1.

Fig. 3 is a reduced horizontal sectional view, taken on line 3—3, Fig. 2.

The valve body 10 of the solenoid valve is shown as having coaxial inlet and outlet ports 11 and 12, respectively, each of which extends short of the center of the valve body and is shown as threaded to receive the pipes which conduct the fluid which the valve controls. At its center the valve body is provided with a large bore 13 shown as extending downwardly from the top of the valve body and formed at its bottom to provide a valve seat 14, this valve seat surrounding a reduced bore 15 leading to the outlet port 12. A diagonal bore 16 connects the enlarged bore 13 with the inlet port 11.

The valve plunger 17 is made of a magnetic material and slides in the sleeve 18 which forms part of a spool 19 of the solenoid. This sleeve 18 is made of stainless steel or other nonmagnetic metal and the lower end of the plunger 17 has bonded thereto a head 20 of synthetic rubber or other soft, resilient, plastic material which seats against the seat 14 of the valve and is of such composition as not to be adversely affected by the particular fluid handled by the valve. To insure a reliable connection betwen the plunger 17 and the synthetic rubber head 20 of the valve, the plunger is formed at its lower end to provide a reduced neck 21 having an enlarged head 22 which is, however, of smaller diameter than the plunger 17. The synthetic rubber head 20 is of cylindrical form and of substantially the same external diameter as the plunger 17 and is centrally formed to provide an enlarged recess 24 to receive the head 20 and a bore 25 of reduced diameter to receive the neck 21.

The lower end of the sleeve 18 is soldered to an annular end plate 26 of substantial thickness, this end plate being provided with a central bore 27 for the plunger 17 and this bore having a rabbet or annular recess at its upper end into which the sleeve 18 is fitted and can be silver soldered. The upper end of the sleeve 18 is fitted around a cylindrical stop 28 which is made of a magnetic material and is provided at its upper end with an annular outwardly extending flange 29 which extends outwardly beyond the sleeve 18 and against the underside of which the sleeve 18 is fitted. Below the flange 29 the stop 28 is provided with an annular recess 30 which is adapted to receive solder 31 which joins the sleeve 18 and the stop 28. It will therefore be seen that the spool 19 is formed by the end plate 26, sleeve 18 and stop 28 and that these parts are soldered together so as to provide a fluid-tight unitary structure. The underside of the stop 28 is axially bored to provide a conical recess 35 leading to a reduced bore 36. The upper end of the plunger 18 is conically formed, as indicated at 37, to fit into the conical recess 35 and is also provided with a small axial bore 38 alining with the bore 36 of the stop 28. A small helical compression spring 40 is arranged in these reduced bores 36 and 38 of the stop 28 and plunger 17, respectively, this spring resisting the effect of inertia on the plunger 17 as well as assisting the seating of the plunger. It will also be noted that the pressure of the fluid entering the inlet port 11 of the valve assists in maintaining the seated condition of the valve and in avoiding leakage thereof, the fit of the plunger 17 in the sleeve 18 being sufficiently loose so that the pressure of the fluid handled is exerted on the top end of the plunger so that the fluid pressure tends to hold the valve closed.

The solenoid coils, indicated at 45, are wound upon the spool 19, suitable insulation 46 being provided between the spool and the coil. The coil assembly is enclosed by an inverted cup-shaped cap 48 which is made of steel or other magnetic material to complete the flux path between the stop 28 and the plate 26, the top of this cup-shaped cap 48 bearing against the stop 28 and the lower rim of the cup-shaped cap 48 being closely fitted to the periphery of the end plate 26. The lower rim of the cup-shaped cap 48 is formed to provide an annular outwardly extending flange 50 which is secured, by screws 51, to the valve body. An annular gasket 52 of soft, resilient plastic material is arranged in annular opposing grooves 53 and 54 provided in the end plate 26 and valve body 10, respectively, and it will therefore be seen that the tightening of the screws 51 serves to draw the cup-shaped cap 48 and spool 19 downwardly, thereby to tightly compress the gasket 52 in its grooves 53 and 54, respectively. This gasket provides a head seal for the valve to positively prevent leakage of the fluid to the exterior thereof.

The valve body is shown as provided with the usual bolt holes 55 by means of which the valve can be attached to any stationary support (not shown) and the valve body is also shown as having a standard connector 56 for the electrical control line (not shown). The electrical connector 56 is connected to the coils 45 of the solenoid in any usual and well known manner. The cup-shaped cap 48 is also shown as having the usual identifying label 57 on its top.

In action, when the coils 45 of the solenoid are energized, a magnetic flux path is set up through the plunger 17, end plate 26, cup-shaped cap 48 and stop 28, thereby to draw the plunger 17 upwardly against the resistance of the spring 40 and to permit the fluid to pass from the inlet port 11 through the diagonal bore 16 into the enlarged central bore 13 and reduced central bore 15 and out through the outlet port 12. The upward movement of the plunger 17 is limited by the stop 28 into the conical recess 36 of which the conical upper end 37 of the plunger seats.

Upon deenergizing the coils of the solenoid, the plunger 17 is forced downwardly and seated by the return spring 40 and the head 20 of synthetic rubber or similar soft, resilient, plastic material is held against the valve seat 14 by the spring 40 and also by the pressure of the fluid.

Since the stainless steel sleeve 18, stop 28 and end plate 26 are soldered together to form a unitary spool structure, and since the cup-shaped cap 48 holds this spool firmly against the annular sealing gasket 54, it will be seen that there is no danger of any leakage of the fluid handled by the valve, especially into the cup which houses the coils of the solenoid.

From the foregoing it will be seen that the present invention provides an extremely simple and inexpensive solenoid valve in which the pressure of the fluid handled is used to maintain the valve in its closed condition and in which the valve is provided with a simple and effective head seal for preventing escape of the fluid being handled, especially into the space occupied by the coils of the solenoid.

We claim as our invention:

An electromagnetic actuating mechanism for a solenoid valve or the like, comprising a supporting body having a bore in one side, a cylindrical plunger of magnetic metal and having one end arranged in said bore and its opposite end provided with an axial bore, a unitary spool including a central sleeve in which said plunger is slidingly fitted, an end plate arranged adjacent said body and having a bore in which said plunger is fitted and an annular face groove around its bore in which the corresponding end of said sleeve is fitted and soldered, a stop plug in the opposite end of said sleeve and soldered therein and having a radially extending end flange fitting the corresponding end of said sleeve, a helical compression spring in said axial bore of said plunger and bearing against said plug, a solenoid coil wound upon said spool, an annular gasket surrounding said plunger and interposed between said end plate of said spool and said body, and means for holding said spool against said gasket, comprising a one piece, cylindrical cup-shaped cap having its end wall bearing directly against the outer extremity of said plug and its side wall surrounding said spool and the solenoid coil wound thereon and having a radially outward extending flange at its open end, and screws having threaded engagement with said body and extending through said radially outward extending flange of said cup-shaped cap and having heads bearing thereagainst.

CLIFFORD J. LANE.
ALBERT M. PATTERSON.